United States Patent
Bays

(10) Patent No.: US 9,948,554 B2
(45) Date of Patent: Apr. 17, 2018

(54) MULTILAYERED DISTRIBUTED ROUTER ARCHITECTURE

(71) Applicant: AT&T Intellectual Property I, L.P., Atlanta, GA (US)

(72) Inventor: Robert Bays, San Francisco, CA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 139 days.

(21) Appl. No.: 14/966,557

(22) Filed: Dec. 11, 2015

(65) Prior Publication Data

US 2016/0173371 A1   Jun. 16, 2016

Related U.S. Application Data

(60) Provisional application No. 62/090,627, filed on Dec. 11, 2014.

(51) Int. Cl.
| | |
|---|---|
| *H04L 12/28* | (2006.01) |
| *H04L 12/773* | (2013.01) |
| *H04L 12/931* | (2013.01) |
| *H04L 12/717* | (2013.01) |

(52) U.S. Cl.
CPC .............. *H04L 45/60* (2013.01); *H04L 45/42* (2013.01); *H04L 49/602* (2013.01)

(58) Field of Classification Search
CPC combination set(s) only.
See application file for complete search history.

(56) References Cited

U.S. PATENT DOCUMENTS

| | | | |
|---|---|---|---|
| 8,717,895 B2* | 5/2014 | Koponen | H04L 12/4633 370/235 |
| 2012/0281520 A1 | 11/2012 | Ansari | |
| 2013/0058346 A1 | 3/2013 | Sridharan | |
| 2013/0223226 A1* | 8/2013 | Narayanan | H04L 45/308 370/236 |

(Continued)

FOREIGN PATENT DOCUMENTS

| | | |
|---|---|---|
| WO | WO 2013/055697 A1 | 4/2013 |
| WO | WO 2015/065290 A1 | 6/2016 |

OTHER PUBLICATIONS

Moon, Daekyeong, et al. "*Bridging the software/hardware forwarding divide*", Technical report, University of California at Berkeley, Nov. 2010. URL http://nsl. cs. usc. edu/~kyriakos/pubs/flowcaching, 15 pages.

(Continued)

*Primary Examiner* — Frank Duong

(74) *Attorney, Agent, or Firm* — Kilpatrick Townsend & Stockton LLP

(57) ABSTRACT

A distributed multilayered network routing architecture comprises multiple layers including a controller layer comprising a controller, a control plane layer comprising one or more control plane subsystems, and a data plane layer comprising one or more data plane subsystems. A controller may be coupled to one or more control plane subsystems. A control plane subsystem may in turn be coupled to one or more data plane subsystems, which may include one or more software data plane subsystems and/or hardware data plane subsystems. In certain embodiments, the locations of the various subsystems of a distributed router can be distributed among various devices in the network.

17 Claims, 7 Drawing Sheets

(56) References Cited

U.S. PATENT DOCUMENTS

| | | | | |
|---|---|---|---|---|
| 2014/0328159 A1* | 11/2014 | Rebella | ................ | H04L 41/042 370/218 |
| 2015/0131989 A1* | 5/2015 | Syed | ................... | H04L 41/0803 398/45 |
| 2017/0126560 A1 | 5/2017 | Bays | | |

OTHER PUBLICATIONS

Vaghani, Raviraj et al., "A Comparison of Data Forwarding Schemes for Network Resiliency in Software Defined Networking", The 9th International Conference on Future Networks and Communications (FNC'14)/The 11th International Conference on Mobile Systems and Pervasive Computing (MobiSPC'14)/Affiliated Workshops, Procedia Computer Science, (Aug. 15, 2014), vol. 34, 2014, doi:10.1016/j.procs.2014.07.097, pp. 680-685.

Hintjens, Pieter, "The ZeroMQ Guide—for C Developers", PDF version available from http://hintjens.com/books and dowloaded Jan. 5, 2016 (no publication date); 494 total pages. Online version available from http://zguide.zeromq.org/page:all with "copyright (c) 2014 iMatix Corporation".

"OpenFlow Switch Specification (Version 1.3.3 (Protocol version 0x04))", Open Networking Foundation, Sep. 27, 2013, 165 pages.

U.S. Appl. No. 14/262,694, Notice of Allowance and Fees Due dated Feb. 22, 2016, 7 pages.

International Application No. PCT/US2015/065290, International Search Report and Written Opinion dated Mar. 2, 2016, 15 pages.

Yang, L; Intel Corp R. Dantu Univ. of North Texas T Anderson Intel Corp R. Gopal Nokia, "Forwarding and Control Element Seperation (ForCES) Framework" Apr. 1, 2004. Sections 1.2, 2, 3.1, 3.2, 3.3, 4.2, 5.1, 5.4, and 5.7; p. 3-p. 29; figures 2, 3, 4, 5b, 40 pages.

International Application No. PCT/US2015/065290 Written Opinion of the International Preliminary Examining Authority dated Nov. 9, 2016, 9 pages.

International Application No. PCT/US2015/065290 Notification of Transmittal of the International Preliminary Report on Patentability dated Feb. 23, 2017, 9 pages.

* cited by examiner

MULTILAYERED DISTRIBUTED ROUTER ARCHITECTURE

CROSS-REFERENCES TO RELATED APPLICATIONS

The present application is a non-provisional of and claims the benefit and priority under 35 U.S.C. 119(e) of U.S. Provisional Application No. 62/090,627, filed Dec. 11, 2014, entitled "MULTI-LAYER ACCELERATED NETWORK ARCHITECTURE", the entire contents of which are incorporated herein by reference for all purposes.

BACKGROUND

The present disclosure relates to data forwarding, and more particularly to a multilayered distributed router architecture.

A router is a specialized network device that is configured to forward data (e.g., data packets) between networks to facilitate the delivery of the data from its source to its intended destination. A router is configured to determine optimal routes or data paths through an internetwork topology and transport data packets using these optimal paths. A router also provides various other services such as firewall, Quality of Service (QoS), and the like.

A conventional router typically comprises a control plane subsystem and one or more data planes that are all housed within a single box or chassis. A data plane, which may be implemented as a linecard in conventional systems, is configured to receive and forward data packets via one or more ports of the data plane. The forwarding is performed based upon forwarding information stored by the data plane. The forwarding information that a data plane uses to forward the data packets is typically programmed by the router's control plane subsystem, which may comprise one or more management cards. The control plane subsystem is configured to control the networking-related functions performed by the router, including, for example, maintaining routing information (e.g., routing information tables), programming the data forwarding planes forwarding information based upon the routing information, handling various networking control protocols, handling the processing of packets (e.g., control and/or data packets) that are terminated at a control plane, processing Access Control Lists (ACLs), Quality of Service (QoS), management functions, and the like.

As previously indicated, in a conventional router, the control plane subsystem of the router and the data planes that are controlled by the control plane subsystem are all physically co-located within the same physical network device box or chassis of the router. As a result, there is a static relationship between the control plane subsystem and the one or more data plane subsystems of the router. This makes programming of such routers in a huge network (e.g., the Internet), which may comprise tens of thousands of such routers, complicated and inflexible. When changes (e.g., addition or reconfigurations of data paths, addition or removal of network devices) have to be made to such networks, each individual router box affected by the change has to be individually programmed or re-programmed. This per router-centric management requirement makes management of such networks very complex and time consuming. As a result, networks using conventional routers lack the flexibility and dynamic configurability desired by today's (and tomorrow's) network applications such as cloud computing, mobile computing, real-time and on-demand video traffic, and the like.

BRIEF SUMMARY

The present disclosure relates to distributed networking, and more particularly to distributed multilayered network routing architecture.

In certain embodiments, a multilayered distributed router architecture is provided. The multiple layers of the router may include a controller layer comprising a controller, a control plane layer comprising one or more control plane subsystems, and a data plane layer comprising one or more data plane subsystems. A controller may be coupled to one or more control plane subsystems. A control plane subsystem may in turn be coupled to one or more data plane subsystems, which may include one or more software data plane subsystems and/or hardware data plane subsystems.

In certain embodiments, the locations of the various subsystems of a distributed router can be distributed among various devices in the network. For example, a controller may be located on a first device, while the control plane subsystems controlled by the controller may be located on different physical devices from the first device. For example, a first control plane subsystem may be located on a second device and a second control plane subsystem may be executed on a third device, where the first, second, and third devices are different devices and may be located at different geographical locations and may be coupled to each other via one or more networks. The data plane subsystems controlled by a control plane subsystem may also be located on different physical devices from the device on which the control plane subsystem that controls those data plane subsystems is located. In the above example, where the first control plane subsystem is located on the second device, a first data plane subsystem controlled by the first control plane subsystem may be located on a fourth device and a second data plane subsystem also controlled by the first control plane subsystem may be located on a fifth device, where the second, fourth, and fifth devices are different devices and may be located at different geographical locations and coupled to one another via one or more networks.

The ability for the different layers of a distributed router to be located on different physical devices enables relationships between the controller and the control plane subsystems, and between the control plane subsystems and the data plane subsystems to be dynamic. For instance, with respect to the controller and the control plane subsystems, the control plane subsystems can be dynamically added or removed remotely from the controller, and the controller is able to operate with the dynamic changes. The locations of the control plane subsystems controlled by a controller may be dispersed both logically and physically in different physical devices. With respect to the control plane subsystems and the data plane subsystems, the data plane subsystems may be dynamically added or removed. For example, a software data plane providing enhanced functionality and services may be dynamically added to the distributed router. The locations of the data plane subsystems controlled by a control plane subsystem may be dispersed both logically and physically in different physical devices.

For example, in one embodiment, a distributed router may comprise a controller executed by a first device and multiple control plane subsystems controlled by the controller. The multiple control plane subsystems may include a first control plane subsystem executed by a second device different from the first device. The distributed router may further include multiple data plane subsystems controlled by the first control plane subsystem. Each such data plane subsystem may be configured to forward data packets. The multiple data plane subsystems may include a software data plane subsystem executed by a third device and a hardware data plane subsystem located on a fourth device. The software data plane subsystem may be configured to forward data packets received by the software data plane subsystem using first forwarding information, and the hardware data plane subsystem may be configured to forward data packets received by the hardware data plane subsystem using second forwarding information. In one embodiment, the first control plane subsystem may receive an instruction related to a network policy from the controller. The first control plane subsystem may then determine an action to be performed for implementing the instruction and communicate the action to the software data plane subsystem. The software data plane subsystem may then perform the action, which may result in the first forwarding information being updated and/or other information regarding one or more forwarding services (e.g., firewall, QoS, NAT, etc.) provided by the software data plane subsystem to be updated. The first control plane subsystem may also communicate the action to the hardware data plane subsystem. The hardware data plane subsystem may then perform processing causing the second forwarding information and/or information regarding one or more forwarding services provided by the hardware data plane subsystem to be updated.

In certain embodiments, a software data plane subsystem may be configured to forward packets using first forwarding information accessible to the software data plane subsystem and/or by applying various forwarding services provided by the software data plane subsystem. For example, the software data plane subsystem, upon receiving a data packet, may perform processing related to a first service for the data packet, determine an output port for the data packet based upon the first forwarding information, and forward the data packet using the determined output port.

In certain embodiments, a hardware data plane subsystem may be configured to forward packets using second forwarding information accessible to the hardware data plane subsystem and/or by applying various forwarding services provided by the hardware data plane subsystem. A hardware data plane subsystem may, upon receiving a data packet, perform processing related to a second service for the data packet, determine an output port for the data packet based upon the second forwarding information, and forward the data packet using the determined output port. The forwarding services provided by a software data plane subsystem may be the same as or different from the forwarding services provided by a hardware data plane subsystem.

In certain embodiments, a distributed router system may comprise a control plane subsystem located on a first device and multiple data plane subsystems configured to forward data packets. The multiple data plane subsystems may include a first data plane subsystem and a second data plane subsystem, where the first data plane subsystem is located on a second device and the second data plane subsystem is located on a third device. In one scenario, the control plane subsystem may receive an instruction and then determine an action based upon the instruction. The control plane subsystem may communicate a message corresponding to the action to the first data plane subsystem and to the second data plane subsystem. The first and second data plane subsystems may then perform processing corresponding to the action.

In certain embodiments, the first data plane subsystem escribed above may be a software data plane subsystem executed by the second device, and the second data plane subsystem may be a hardware data plane subsystem located on the third device, the second data plane subsystem comprising forwarding hardware. The control plane subsystem may communicate with the first and second data plane subsystems using a control channel. The same control channel may be used irrespective of whether the target data plane subsystem is a software data plane subsystem or a hardware data plane subsystem. The forwarding hardware may be a merchant silicon chip, a network interface card (NIC), a field programmable gate array (FPGA), and the like.

In certain embodiments, a hardware abstraction layer (HAL) may be provided for the forwarding hardware on a hardware data plane subsystem. The HAL is configured to receive a message communicated by a control plane subsystem and translate the message to a set of one or more application programming interfaces (APIs) corresponding to the forwarding hardware. The determined set of APIs may then be executed by the forwarding hardware.

In certain embodiments, the distributed router may include a controller that may be executed by a device that is different from the devices executing the control plane subsystems and the data plane subsystems. A user may use the controller to configure network-wide policies. Instructions corresponding to such policies may be communicated from the controller to one or more control plane subsystems controlled by that controller.

The data plane subsystems, including software data plane subsystems and/or hardware data plane subsystems, represent the data forwarding layer of the distributed router. In one embodiment, a data plane subsystem may receive a data packet via an input port. The data plane subsystem may then determine an output port for forwarding the data packet. This determination may be made based upon forwarding information available to the data plane subsystem and/or other information related to forwarding services provided by the data plane subsystem. The forwarding information and the other information may have been received from a control plane subsystem controlling that data plane subsystem prior to receiving the data packet. The data plane subsystem may then forward the data packet to a next hop using the determined output port.

In another embodiment, upon receiving a data packet via an input port, a data plane subsystem may forward the data packet to a second data plane subsystem for performing a first service for the packet. The initial data plane subsystem may then receive the data packet back from the second data plane subsystem after the second data plane subsystem has performed the first service. The initial data plane subsystem may then determine an output port for forwarding the data packet, and then forward the data packet using the determined output port. The initial and second data plane subsystems may be software or hardware data plane subsystems. The first service may be a service such as a firewall service, QoS, network address translation (NAT), security service, and the like.

In yet another embodiment, a first data plane subsystem may, upon receiving a data packet via an input port, perform processing corresponding to a first service for the data packet and then forward the data packet to a second data plane subsystem. The second data plane subsystem may then perform processing corresponding to a second service for the data packet, determine an output port for forwarding the data packet, and then forward the data packet to a next hop using the determined output port.

The foregoing, together with other features and embodiments will become more apparent upon referring to the following specification, claims, and accompanying drawings.

DETAILED DESCRIPTION

In the following description, for the purposes of explanation, specific details are set forth in order to provide a thorough understanding of embodiments of the invention. However, it will be apparent that various embodiments may be practiced without these specific details. The figures and description are not intended to be restrictive. The word "exemplary" is used herein to mean "serving as an example, instance, or illustration." Any embodiment or design described herein as "exemplary" is not necessarily to be construed as preferred or advantageous over other embodiments or designs.

Figure 1:
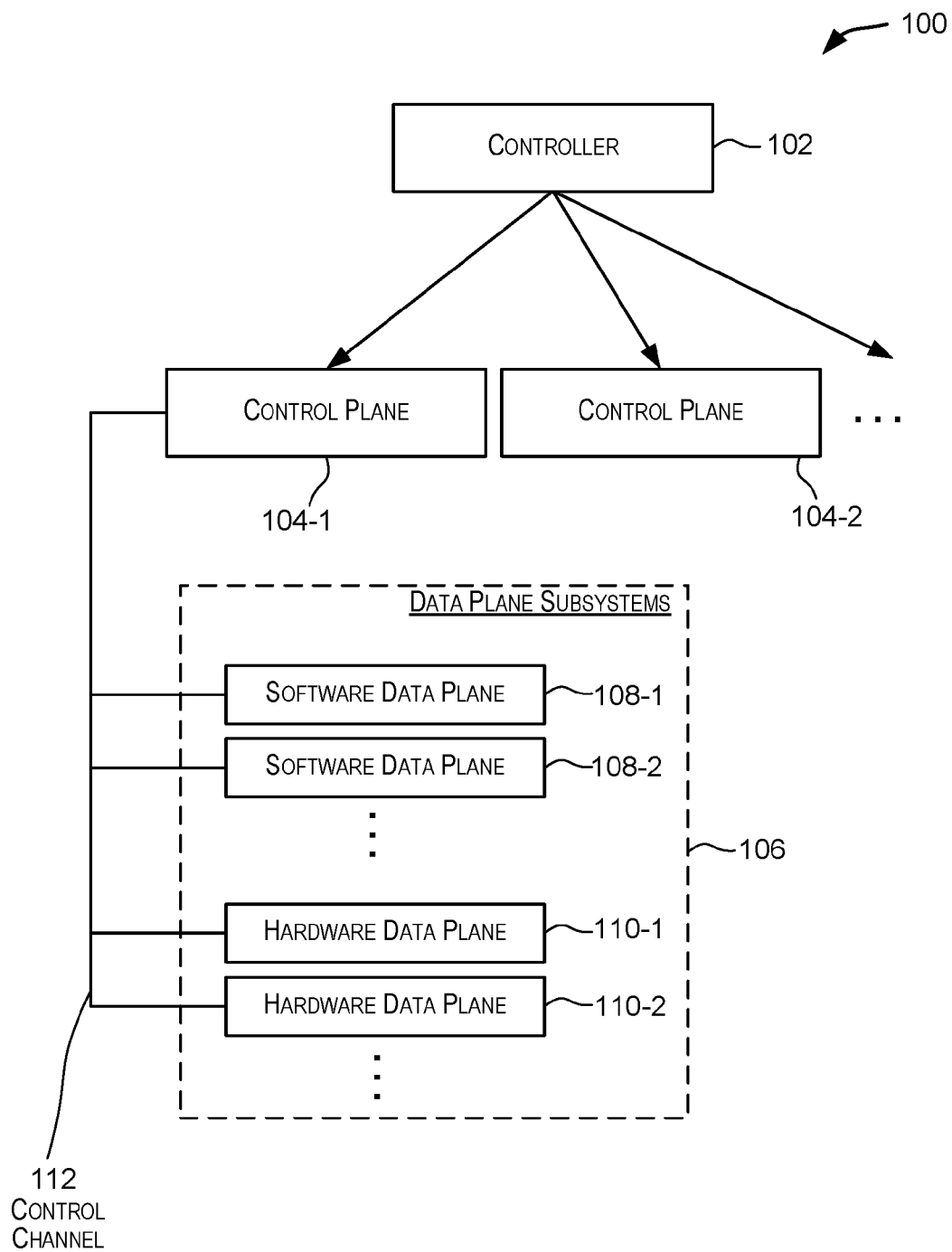
FIG. 1 is a simplified block diagram illustrating a distributed multilayered router architecture 100 according to an embodiment of the present invention.

The present disclosure relates to data forwarding, and more particularly to a distributed multilayered network router architecture. FIG. 1 is a simplified block diagram illustrating a distributed multilayered router architecture 100 according to an embodiment of the present invention. The embodiment depicted in FIG. 1 is merely an example and is not intended to unduly limit the claimed embodiments of the present invention. One of ordinary skill in the art would recognize many variations, alternatives, and modifications. For example, in some other embodiments, router 100 may have more or fewer components than shown in FIG. 1, may combine two or more components, or may have a different configuration or arrangement of components.

Distributed router 100 depicted in FIG. 1 includes multiple layers including a controller layer comprising controller 102, a control plane layer comprising one or more control plane subsystems 104-1, 104-2, and a data plane layer comprising one or more data plane subsystems 106. Data plane subsystems 106 can include one or more of software data plane subsystems 108-1, 108-2, etc., and hardware data plane subsystems 110-1, 110-2, etc. Distributed router 100 is configured to provide Layer 2 and Layer 3 (of the OSI model) routing functionality. Distributed router 100 may also provide functionality at Layers 4-7 of the Open Systems Interconnection (OSI) model.

Controller 102 is responsible for overall network configuration and management. In certain embodiments, controller 102 can be used to set global network-wide policy and its orchestration, which can be done across multiple network devices. A user of router 100 can use controller 102 to create end-to-end network services across different components and devices in a network environment. Controller 102 may be configured to orchestrate an end-to-end path between the various components in the distributed architecture. Controller 102 is responsible for setting up service paths and providing visibility into the network traffic. Controller 102 may also be configured to perform various analytics.

Controller 102 is communicatively coupled to one or more control plane subsystems 104 via one or more communication channels. Controller 102 may use different protocols to communicate with the control plane subsystems. The communication protocol used by controller 102 to communicate with a first control plane subsystem 104-1 may be the same as or different from a communication protocol used by controller 102 to communicate with a second control plane subsystem 104-2, or other control plane subsystems.

In some embodiments, the type of communication protocol used by controller 102 to communicate with a control plane subsystem depends upon whether the control plane subsystem is part of a "thin edge" network device or a "thick edge" network device. In certain embodiments, a network device is classified as a thick edge device if it can maintain state on flows and can maintain configuration state across reboots. Examples of thick edge devices include routers, firewalls, and load balancers. Thick edge devices are capable of determining path reachability independent of a central controller. Typically, the central controller will tell the thick edge device how to determine path reachability though configuration of the device. This could be through a combination of policy, such as ACLs, NAT, etc., and routing protocols such as Border Gateway Protocol (BGP), Intermediate Service to Intermediate Service Protocol (IS-IS), Open Shortest Path First (OSPF), etc. Once informed of the policy, the thick edge device is capable of determining forwarding path independently of a third party controller. Thick edge devices are also typically able to maintain a greater level of state on flows. An example of maintaining state on flows would be a stateful ACL rule in a router classifying packets as belonging to the same TCP session and then routing those packets based on policy defined for that it. The router contains enough logic and memory to maintain a record of the history of the TCP session between the two endpoints and is able to determine that individual packets in a flow are related even though they may not have the same format or meta-data. A thick edge device maintains sufficient logic to maintain state for flows and can operate without controller 102.

In certain embodiments, controller 102 interfaces with control plane subsystems in thick edge devices using Network Configuration Protocol (NETCONF), which is a network management protocol developed and standardized by IETF. NETCONF provides mechanisms to install, manipulate, and delete the configuration of network devices. Its operations are realized on top of a simple remote procedure call (RPC) layer. The NETCONF protocol uses an Extensible Markup Language (XML) based data encoding for the configuration data as well as for the protocol messages. The protocol messages are exchanged on top of a secure transport protocol. Examples of thick edge devices include, without restriction, various products provided by Brocade Communications Systems, Inc. of San Jose, Calif., such as vRouter series of products (e.g., 5400 vRouter, 5600 vRouter), vADCs (virtual Application Delivery Controllers), MLX Series when using NETCONF, VDX Series when using NETCONF, and the like.

A network device is classified as a thin edge device if it uses a series of match-action tables to determine forwarding and therefore cannot maintain state on flows. An example of a thin edge device is a switch. Thin edge devices typically switch based on flow entries and are typically modeled on an abstract representation of a physical switches TCAM. OpenFlow is one protocol that is representative of a thin edge device. Using OpenFlow, a central controller is responsible for determining network reachability. It then programs the thin edge device of explicit reachability. Thin edge devices typically don't have the ability to determine forwarding path independently of a controller nor can they maintain enough state on traffic to do complex packet/session associations. In certain embodiments, controller 102 communicates with control plane subsystems in thin edge devices using OpenFlow communication protocol. The OpenFlow standard is managed by the Open Networking Foundation (ONF), an organization dedicated to promotion and adoption of software-defined networking (SDN). Examples of thin edge devices include, without restriction, various products provided by Brocade Communications Systems, Inc. of San Jose, Calif., such as MLX when using OpenFlow, VDX when using OpenFlow, and the like.

Controller 102 may also use other protocols to communicate with control plane subsystems. In certain instances, controller 102 may communicate with a control plane subsystem using YANG or REST. YANG is a data modeling language used to model configuration and state data that is manipulated by NETCONF remote procedure calls, and NETCONF notifications. YANG may be used to model configuration and state data for communication between controller 102 and the control plane subsystems. In some embodiments, REST (REpresentational State Transfer) application programming interfaces (APIs) may be used by controller 102 to communicate with the control plane subsystems. In alternative embodiments, other communication protocols may be used for communications between controller 102 and the various control plane subsystems such as PCEP (Path Computation Element Communication Protocol), BGP-LS (Border Gateway Protocol-Link State), and others.

In certain embodiments, a controller 102 is implemented as a set of instructions (code or program) executed by one or more processing entities such as processors provided by Intel® or AMD®. For example, controller 102 may be executed by a computing system such as the one depicted in FIG. 6 and described below. In a multicore processor environment, controller 102 may be executed by one or more cores of one or more processors. In a virtualized environment including one or more virtual machines executed by one or more processors, controller 102 may be executed within or hosted by a virtual machine or even by a hypervisor or network operating system.

As depicted in FIG. 1, controller 102 can control and manage one or more (one-many relationship) control plane subsystems such as control plane subsystems 104-1 and 104-2. A single control plane subsystem 104 is able to control multiple data plane subsystems (one-many relationship). The data plane subsystems 106 controlled by a control plane subsystem 104 can be of different types, including software data plane subsystems 108 and/or hardware data plane subsystems 110. A control plane subsystem can communicate with multiple data plane subsystems in parallel or concurrently using a control channel 112.

In certain embodiments, a controller is configured with a set of control plane subsystems that it is responsible for. It then configures those entities based on the network policy. When configuring thick edge devices, it might do so using NETCONF. When configuring thin edge devices, it might do so using OpenFlow.

A control plane subsystem 104 is configured to implement a network policy received from controller 102. In one embodiment, a control plane subsystem 104 is configured to translate a policy into a set of actions that data planes 106 controlled by the control plane subsystem 104 are to take to implement the policy. A control plane subsystem 104 is thus responsible for taking network policies received from controller 102 and translating them to actions for data plane subsystems 106. A control plane subsystem learns which data plane subsystems it controls when the data plane subsystems register themselves with the control plane subsystem on their initialization. In certain embodiments, a control plane subsystem is externally programmable using a communication protocol such as NETCONF or OpenFlow and may be programmed using REST APIs.

Control plane subsystems 104 may use various different communication techniques to communicate with data plane subsystems 106. In certain embodiments, as depicted in FIG. 1, a control plane subsystem 104-1 uses a control channel 112 to communicate with both software data planes 108 and hardware data planes 110. In one embodiment, messaging over control channel 112 may use a ZeroMQ transport mechanism with JSON (JavaScript Open Notation) encapsulation. ZeroMQ (also spelled as ØMQ or 0MQ or ZMQ) is a high-performance asynchronous messaging library, aimed at use in scalable distributed or concurrent applications. It provides a message queue that can run without a dedicated message broker. The library is designed to have a familiar socket-style API. It provides sockets that carry atomic messages across various transports like in-process, inter-process, TCP, and multicast. Its asynchronous I/O model enables scalable multicore applications. JSON provides a mechanism for providing a hierarchical view of the distributed network system. From the perspective of a control plane subsystem, it uses the same control channel 112 and the same communication scheme when communicating with a software data plane or a hardware data plane. In this sense, a control plane subsystem does not differentiate whether it is talking to a software data plane or a hardware data plane.

For example, a control plane subsystem 104 may receive a firewall policy configured by a user from controller 102. In response, control plane subsystem 104 may create a data model representation for the firewall policy and store policy related information in local data structures. Control plane subsystem 104 may then translate the data model representation into a JSON representation, which is then encapsulated into a ZeroMQ message and communicated to the various data plane subsystems using the ZeroMQ bus over control channel 112.

A control plane subsystem may also receive messages from one or more data plane subsystems via control channel 112. These messages may, for example, communicate status and state information for the data plane subsystems to the control plane subsystem. For example, if there is a change in a data plane subsystem (e.g., an interface state change), that information is encapsulated by the data plane subsystem into a JSON representation, which in turn is encapsulated into the ZeroMQ message bus and sent to the control plane subsystem 104 using control channel 112. The control plane subsystem 104 may then take actions to respond to the state change (e.g., change state information, change routes, etc.).

In certain embodiments, each control plane subsystem 104 is implemented as a set of instructions (code or program) executed by one or more processing entities such as processors provided by Intel® or AMD®. For example, control plane subsystems 104-1 and 104-2 may be executed by a computing system such as the one depicted in FIG. 6 and described below. In a multicore processor environment, a control plane subsystem may be executed by one or more cores of one or more processors. In a virtualized environment including one or more virtual machines executed by one or more processors, a control plane subsystem may be executed within or hosted by a virtual machine or even by a hypervisor (e.g., KVM hypervisor) or network operating system. Control plane subsystems may be deployed on bare metal, in virtual machines, and the like.

Control plane subsystems 104 are responsible for configuration and management of data plane subsystems 106. For example, control plane subsystems are configured to maintain routing and topology information for the distributed network. This information is then used by a control plane subsystem to program one or more data plane subsystems such that the data planes are enabled to forward data packets to facilitate the delivery of the data packets from their source to their intended destination. In certain embodiments, a control plane subsystem is configured to download forwarding information to a data plane subsystem. This forwarding information is then used by the data plane subsystem to forward data packets received by the data plane subsystem. A control plane subsystem may also download other policies-related (e.g., related to a firewall policy) information to a data plane subsystem.

There are various ways in which a control plane subsystem may receive network and topology information. A control plane subsystem may perform processing to support various networking protocols that exchange network and topology information between network devices. A control plane subsystem may generate and process control-plane packets either destined to or originated by other components of the distributed network system. For example, control plane subsystems 104 may exchange topology information with each other or with other network devices or systems and construct/maintain the routing table using routing protocols such as routing information protocol (RIP), open shortest path first (OSPF) or border gateway protocol (BGP).

In certain embodiments, a control plane subsystem may communicate with another control plane subsystem for the purposes of high availability or failover. In certain embodiments, communications between two control plane subsystems is enabled using the control channel.

Data planes subsystems 106 represent the data forwarding layer of distributed router 100 and can include one or more software data plane subsystems 108-1, 108-2; etc. ("108" in general) and hardware data plane subsystems 110-1, 110-2, etc. ("110" in general). For example, a distributed router implementation may have only one or more software data plane subsystems and no hardware data plane subsystems. In yet another implementation, all the data planes may be hardware data plane subsystems with no software data plane subsystems. In yet another implementation, the data plane layer may include a combination of software data plane subsystems and hardware data plane subsystems.

Collectively, data plane subsystems 106 are responsible for receiving data packets and forwarding the data packets to the next hop in the network based on the forwarding and configuration information received from control plane subsystems 104. Each data plane subsystem is programmed with forwarding information received from one or more control plane subsystems. The data plane subsystem uses the forwarding information to forward data packets. In certain implementations, a data plane subsystem supports Layer 2 and Layer 3 (of the OSI model) routing functionality. In certain embodiments, a data plane subsystem may also provide OSI Layers 4-7 functionality. Data plane subsystems 106 may provide router-related functionalities such as stateful and stateless firewalls, application flows, application logic gateways, Network Access Device (NAD) capability, and in some instances, partial or full implementations of Layer 4 routing and higher level data packet inspection capabilities, MPLS-related processing, network address translation (NAT), stateful Network Attached Storage (NAS), hierarchical QoS (Quality of Service), Q-in-Q, support for Internet Protocol Security (IPsec), Generic Routing Encapsulation (GRE), Virtual eXtensible LAN (VXLAN), various tools for analysis and management of data flows, Deep Packet Inspection (DPI), Longest Packet Match (LPM) packet lookups, Virtual Private Networks (VPNs), and other functionalities.

A data plane subsystem 106 may receive a data packet via a port of the data plane subsystem. The port may be a logical port or a physical port. The data plane subsystem then determines how the received packet is to be forwarded. As part of this determination, the data plane subsystem may extract information from the received data packet (e.g., extract header information), determine the source the destination information for the data packet from the extracted information, and the determine how the data packet is to be forwarded based upon the extracted information, forwarding information and other applicable policies related information received by the data plane subsystem from a control plane subsystem and stored by the data plane subsystem. In certain embodiments, if the data plane subsystems cannot determine how a received packet is to be forwarded, then the packet is dropped. Else, the data plane subsystem determines an output port to be used for forwarding the packet to the next hop so as to facilitate communication of the packet to its intended destination. The data plane subsystem then forwards the data packet using the determined output port.

The data plane subsystems can also communicate with each other via ports of the subsystems. A software data plane subsystem may communicate with another software data plane subsystem or with another hardware data plane subsystem. A hardware data plane subsystem may communicate with another hardware data plane subsystem or with another software data plane subsystem. In certain embodiments, a Peripheral Component Interconnect Express (PCIe) interface is used for communications between the various data planes. In certain embodiments, a software data-plane subsystem 108 may communicate with a hardware data plane subsystem 108 using a standardized interface implemented with REST, YANG, ZeroMQ, JSON representation, or any other suitable protocol. Providing standardized interfaces between each of the data plane subsystems allows for swapping in and out of the data plane subsystems without having to worry about how the data plane subsystem will communicate with each other. In general, providing standardized communication interfaces between the various layers of the distributed router enables flexibility in swapping in-and-out various components at the different layers without impacting router functionality. This also enables changes to be made to the router such as adding additional functionalities in an easy and flexible manner.

As indicated above, a data plane subsystem can be a software data plane subsystem 108 or a hardware data plane subsystem 110. A software data plane subsystem 108 is implemented as a set of instructions (or code) executed by one or more processing entities such as processors provided by Intel®, AMD®, Power, ARM, application specific integrated circuits (ASIC) or field programmable gate arrays (FPGAs), or Network Processing Units (NPUs). For example, software data plane subsystems 108-1 and 108-2 depicted in FIG. 1 may be executed by computing systems such as the one depicted in FIG. 6 and described below. In a multicore processor environment, a software data plane subsystem may be executed by one or more cores of one or more processors. In a virtualized environment including virtual machines executed by one or more processors, a software data plane subsystem may be executed within or hosted by a virtual machine executed or even by a hypervisor (e.g., KVM hypervisor) or network operating system.

As indicated above, a software data plane subsystem may also be executed by one or more NPUs. An NPU is generally a programmable multicore microprocessor that is specifically designed and optimized to handle network-related functions. Network processors are typically software programmable devices and would have generic characteristics similar to general purpose central processing units and are optimized for performing networking-related functions such as pattern matching, key lookup, computation, bits manipulation, allocation and management of buffers, etc. Software data plane subsystems may be deployed on bare metal, in virtual machines, and the like.

Software data plane subsystems 108 are configured to provide high speed data packet forwarding capabilities. In one embodiment, a software data plane subsystem may use a Linux-based forwarding pipeline. In another embodiment, for even faster processing, a MCEE (Multi Core Execution Environment) architecture is used, which enables packets to be processed in parallel at high speeds. A software data plane subsystem using the MCEE model is configured to spray the received data packets to individual cores that are dedicated to processing those packets. Each core processes the packets it receives and the forwards the packets to the outbound port. Packet processing is significantly sped up using the MCEE architecture because it enables parallel processing of the packets and the distribution of packets to a number of processing resources that are dedicated to processing the packets.

In certain embodiments, the software that implements a software data plane subsystem is designed and built such that it is portable and able to execute on different processor architectures, e.g., Intel architectures, ARM devices, PowerPC devices, and the like. Different software data plane subsystems running on different processor architectures may be controlled by the same control plane subsystem 104.

In certain embodiments, software data plane subsystems 108 are configured to provide all the functionalities provided by a traditional linecard-based forwarding mechanism. Examples of services or functionalities that may be provided by a software data plane subsystem include, without limitation, L2 switching, L3 forwarding IPv4/6, MPLS processing, stateless and stateful firewall functionality, network address translation (NAT), stateful Network Attached Storage (NAS), hierarchical QoS (Quality of Service), Q-in-Q, support for Internet Protocol Security (IPsec), Generic Routing Encapsulation (GRE), Virtual eXtensible LAN (VXLAN), various tools for analysis and management of data flows, Deep Packet Inspection (DPI), Longest Packet Match (LPM) packet lookups, Virtual Private Networks (VPNs), and the like. Since a software data plane subsystem is implemented as software, additional functionalities can be easily added by developing new software data plane subsystems or updating existing software data plane subsystems with additional functionalities and these new or updated software data plane subsystems can then be plugged into a distributed router.

Hardware data plane subsystems 110 may be implemented using general purpose CPUs, network interface cards (NICs), merchant silicon designed for networking applications, and/or FPGAs. Examples of general purpose CPUs that can be used include, without limitation, x86 processors from Intel®, AMD® processors, TI® processors, and the like. Examples of NICs that can be used include, without limitation, Fortville® network adapters and controllers from Intel®, Cumulus® from Broadcom®, LiquidIO® from Cavium®, and others. Examples of merchant silicon that can be used include, without limitation, Red Rock Canyon® (RRC) switching technology from Intel®, Tomahawk® from Broadcom, and others. Tomahawk® is an example of advanced switching technology that may be used for implementing various forwarding functions such as PCIe based virtual private exchange (vPE) or supporting multi-protocol label switching (MPLS), and others.

In some embodiments, hardware data plane subsystems 110 may provide functionalities similar to those provided by the software data plane subsystems. In some other embodiments, a hardware data plane subsystem may provide functionalities that supplement functionalities provided by the software data plane subsystems. In yet other embodiments, a hardware data plane subsystem may provide one or more functions that are not provided by the available software data plane subsystems. In some instances, the hardware data plane subsystem may offload certain functionalities, from the software data plane subsystems, and provide hardware speed switching and processing for less processing-intensive, repetitive and/or frequent functions. In some instances, the hardware data plane subsystems 110 may offload complex tasks that are less frequently present in software data plane subsystems 108.

Implementing the data plane layer using software data-plane subsystems 108 and hardware data plane subsystems 110 provides the desired flexibility for processing performed by the data plane layer. In one embodiment, hardware data plane subsystems may be used for providing hardware speed switching for repetitive and less intensive networking functions using feature specific hardware, while maintaining the versatility and cost-benefits of executing more complex and less frequent functionality in software data plane subsystems executing on cheap commodity hardware components, such as general purpose processors.

As described above, the CPUs, NPUs, merchant silicon, and NICs (referred to collectively as "forwarding hardware") that are used to implement a hardware data plane subsystem can be provided by different vendors. A control plane subsystem may thus be controlling hardware data plane subsystems from multiple vendors at the same time. From the control plane subsystem's perspective, it does not differentiate when communicating with a software data plane subsystem or a hardware data plane subsystem; the control plane subsystem uses the control channel (e.g., ZeroMQ transport using JSON encoding) to communicate with the data plane subsystems.

A vendor providing a forwarding hardware may provide various vendor-specific APIs for controlling and interacting with the forwarding hardware. For example, Broadcom provides an API for interacting and controlling Broadcom's Tomahawk merchant silicon. Accordingly, the messages received from the control channel by a hardware data plane subsystem need to be translated to the forwarding hardware vendor-specific APIs. A Hardware Abstraction Layer (HAL) is thus provided for each forwarding hardware, where the HAL is configured to translate messages received via the control channel to forwarding hardware vendor-specific APIs.

Figure 2:
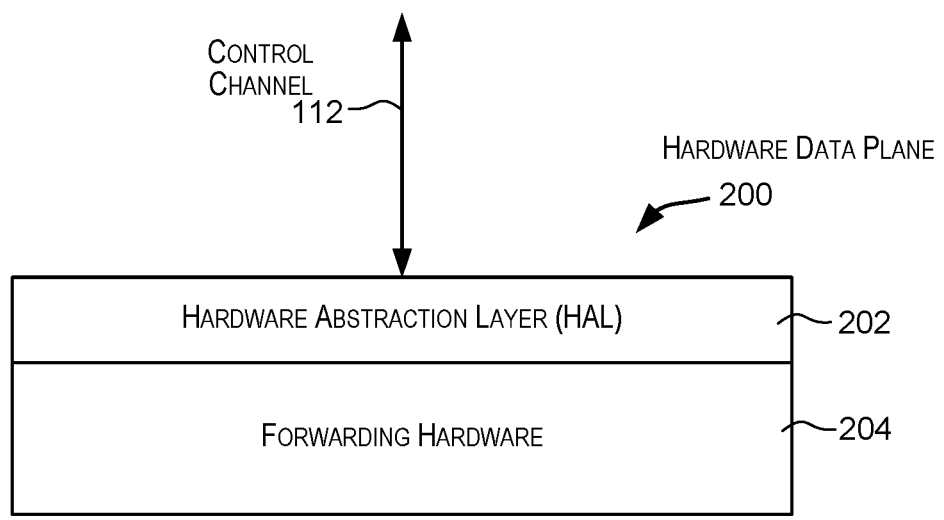
FIG. 2 depicts an example hardware data plane subsystem with a hardware abstraction layer (HAL) according to an embodiment of the present invention.

FIG. 2 depicts an example hardware data plane subsystem 200 with a HAL according to an embodiment of the present invention. As shown in FIG. 2, HAL 202 acts as an interface between control channel 112 and forwarding hardware 204 that is used to implement the hardware data plane subsystem. HAL layer 202 is responsible for translating the configuration, policy and state information from the control plane's control channel to the hardware data plane. HAL 202 is configured to receive messages from control channel 112 and translate them to APIs provided by the vendor of forwarding hardware 204. In the opposite direction, forwarding hardware 204 may provide information (e.g., network status) to HAL 202 using the vendor-specific APIs and HAL 202 may then be configured to translate these to messages in a format used by control channel 112.

HAL 202 may be configured to provide translations between various different messaging formats and various vendor-specific APIs. For example, HAL 202 may support interfaces based on various messaging or bus protocols such as REST, YANG, ZeroMQ and/or JSON, and others.

HAL 202 thus provides a standardized interface to the underlying forwarding hardware regardless of the type of the forwarding hardware and the vendor providing the forwarding hardware. In some instances, HAL 202 may provide the ability to inventory or discover the underlying forwarding hardware's 204 APIs and capabilities. The use of HALs increases the flexibility and interoperability of the distributed router architecture. A control plane subsystem can operate with different hardware data plane subsystems, possibly from different vendors. A hardware data plane subsystem provided by one vendor (e.g., Broadcom) can be switched to a hardware data plane subsystem provided by another vendor (e.g., Cavium) without having to make any changes to control channel 112 or to control plane subsystem 104. HAL 202 can take inputs from the generic components (e.g., from the control plane control channel) and translate them to forwarding hardware vendor-specific APIs.

Figure 7:
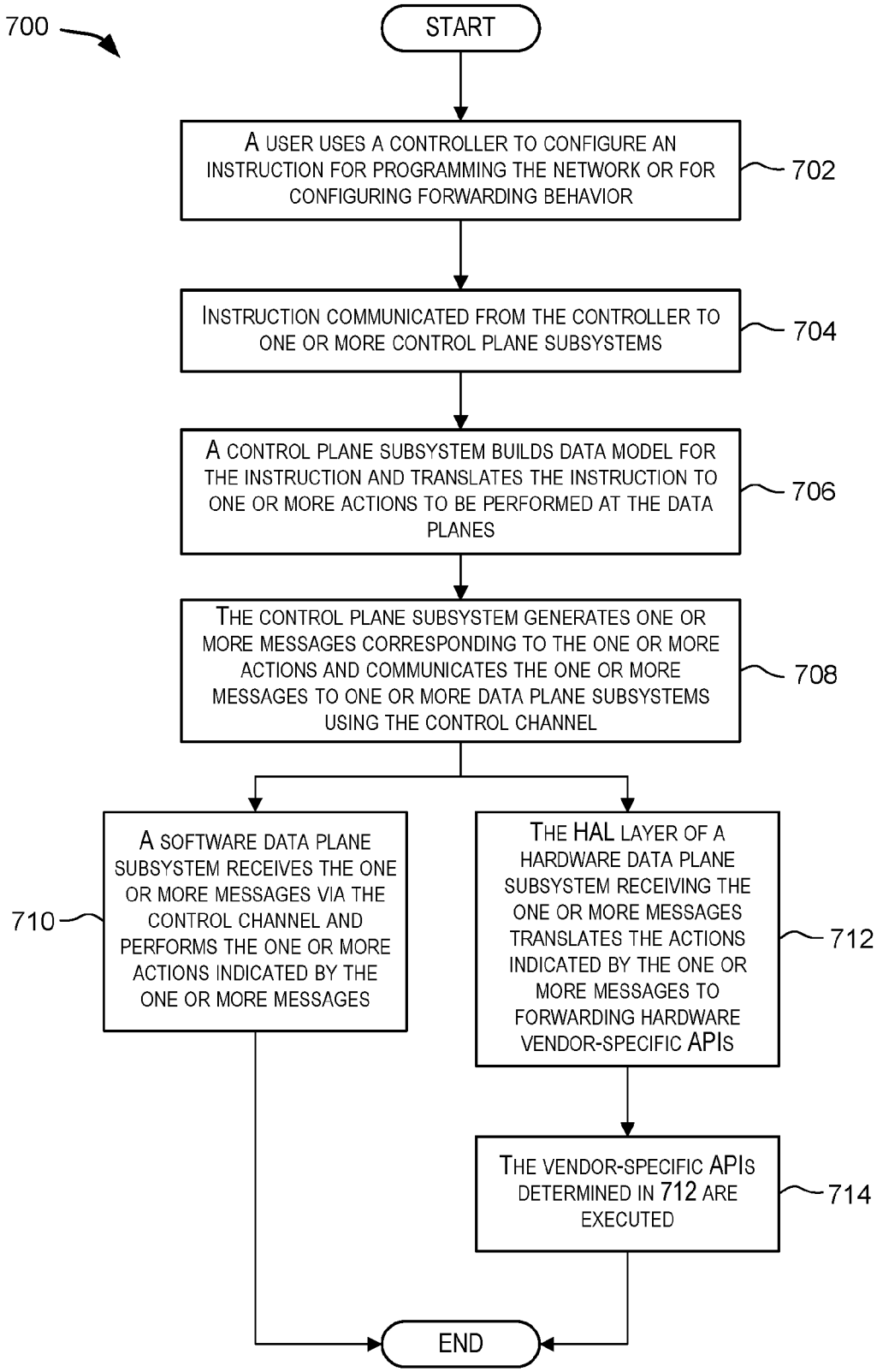
FIG. 7 depicts a simplified flowchart showing processing performed for programming a distributed router according to an embodiment of the present invention.

FIG. 7 depicts a simplified flowchart 700 showing processing performed for programming a distributed router according to an embodiment of the present invention. The particular series of processing steps depicted in FIG. 7 is not intended to be limiting. It is appreciated that the processing steps may be performed in an order different from that depicted in FIG. 7, and that not all the steps depicted in FIG. 7 need be performed.

At 702, a user of the distributed router may provide an instruction using a controller of the distributed router. In one embodiment, the controller may provide an interface that may be used by the user to provide the instruction. The instruction may also be provided via a command line interface (CLI) provided by the controller. The instruction may correspond to a network policy that the user wants to configure for one or more networks. For example, the network policy may be related to firewall, QoS, NAT, and the like.

At 704, the instruction is communicated from the controller to one or more control plane subsystems. Various different protocols may be used for communicating the instruction from the controller to the control plane subsystems. For example, if the control plane subsystem is part of a thick edge device, then a protocol such as NETCONF may be used for communicating the instruction from the controller to the control plane subsystem. If the control plane subsystem is part of a thin edge device, then a protocol such as OpenFlow may be used for communicating the instruction from the controller to the control plane subsystem. Various other protocols may also be used.

At 706, a control plane subsystem receiving the instruction may build a data model for the instruction and store instruction information in local data structures and translate the instructions to one or more actions to be performed at the data plane layer. The actions may be related to one or more policies to be implemented or updated at the data plane layer for the network policy instruction received from the controller. The actions may relate to updates to forwarding information or configuration information to be performed at the data plane layer for the network policy instruction received from the controller. In certain embodiments, a control plane subsystem may store information that is used to map instructions received from the controller to one or more actions and/or policies to be performed at the data plane layer. Configuration of the control plane could include routing protocol configuration, firewall rules, management services such as SNMP and NetFlow, etc.

At 708, the control plane subsystem generates one or more messages corresponding to the one or more actions and communicates the one or more messages to one or more data plane subsystems using the control channel. For example, in one embodiment, the control plane subsystem may generate one or more JSON encoded messages corresponding to the one or more actions and communicate the messages to one or more data plane subsystems using the ZeroMQ transport bus.

The messages in 708 may be sent to one or more software data plane subsystems and/or one or more hardware data plane subsystems. Upon receiving the one or more messages via the control channel, at 710, a software data plane subsystem is configured to perform processing corresponding to the one or more actions. The actions may program the software data plane. For example, the actions may be used to programmatically update the forwarding information and/or configuration information used by the software data plane for forwarding data packets. The actions may also program or update the services (e.g., firewall, DPI, etc.) provided by the software data plane subsystem. For example, the action may cause information stored by a data plane subsystem regarding a service provided by the data plane subsystem to be stored and/or updated.

If the one or more messages are received by a hardware data plane subsystem, at 712, the HAL layer corresponding to the forwarding hardware of the hardware data plane subsystem may translate the one or more actions indicated by the messages to one or more forwarding hardware vendor-specific API calls. At 714, the API calls determined in 712 are then executed. Executing the APIs programs the hardware data plane subsystem. For example, the actions may be used to programmatically update the forwarding information and/or configuration information used by the hardware data plane for forwarding data packets. The actions may also program or update the services (e.g., MPLS forwarding) provided by the hardware data plane subsystem. For example, the action may cause information regarding a service provided by the hardware data plane subsystem to be stored and/or updated.

The following use case helps illustrate the processing depicted in FIG. 7 and described above. In this example, a user may want to set the IP address on port eth0 to 1.1.1.1/24. A user may use a controller 102 to provide the appropriate instructions to a control plane subsystem 104. This may be done using NETCONF, command line interfaces, and the like. Next, control plane subsystem 104 may build a data model and local data structures in response and translate the instructions to one or more actions to be communicated to one or more data planes. Control plane subsystem 104 may then, via the control channel, use the ZeroMQ transport mechanism with JSON encoding (e.g., packet with ZeroMQ header and JSON interface) to send messages corresponding to the actions to one or more data plane subsystems. A hardware data plane subsystem may receive the message sent by control plane subsystem 104. This message packet would come to the HAL layer of the hardware data plane subsystem. HAL then deconstructs and deserializes the 0mQ/JSON message, and calls the forwarding hardware vendor-specific APIs to set the interface's IP address (e.g., for a Broadcom forwarding hardware, the Broadcom API set_interface(1.1.1.1) may be called). In this manner, instructions flow from the controller to the data plane subsystem, where corresponding actions are performed.

Figure 3:
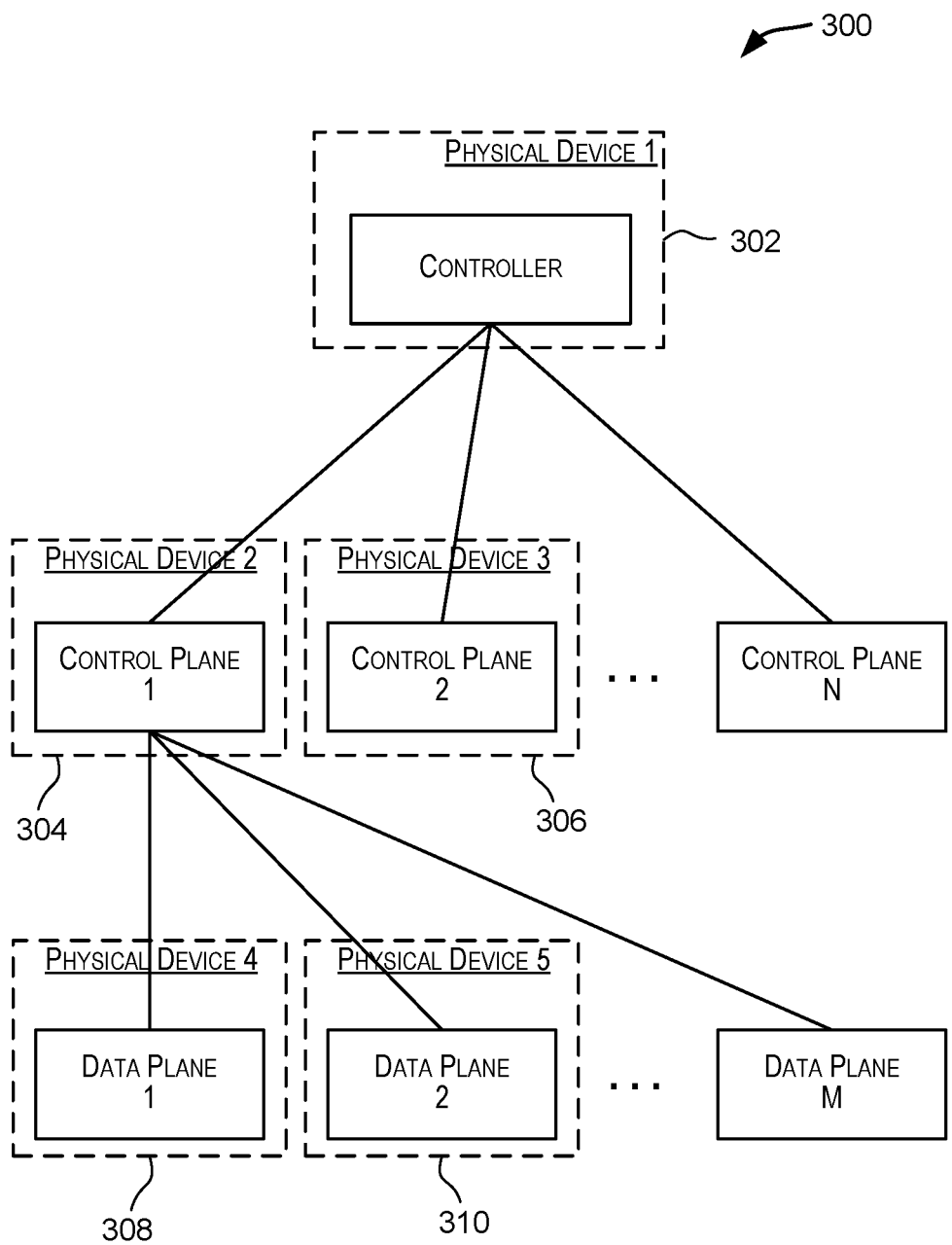
FIG. 3 is a simplified block diagram of a distributed router illustrating the distributed nature of the architecture according to an embodiment of the present invention.

FIG. 3 is a simplified block diagram of a distributed router 300 illustrating the distributed nature of the architecture according to an embodiment of the present invention. As depicted in FIG. 3, distributed router 300 includes a controller 302 that communicates with multiple control plane subsystems such as subsystems "Control Plane 1," "Control Plane 2," etc. There can thus be a one-to-many relationship between a controller and control plane subsystems. Each control plane subsystem in turn can control one or more data plane subsystems, which can include one or more of software data plane subsystems and hardware data plane subsystems. Accordingly, there can be a one-to-many relationship between a control plane subsystem and data plane subsystems.

In certain embodiments, the various subsystems of router 300 can be distributed among various devices in the network. For example, in the embodiment depicted in FIG. 3, the controller may be executed on a first device 302, control plane subsystem_1 may be executed on a second device 304, and control plane subsystem_2 may be executed on a third device 306, where the first 302, second 304, and third 306 devices are different devices and may be located at different geographical locations. Device 302 may be communicatively coupled with devices 304 and 306 over one or more networks. A control plane subsystem may thus be located on a computing system or device that is remote from a computing system or device hosting a controller.

As shown in FIG. 3, control plane subsystem 1 controls multiple data plane subsystems including data plane subsystem 1 and data plane subsystem 2. Data plane subsystem 1, which may be a software data plane subsystem, may be executed by a fourth device 308. Data plane subsystem 2, which may be a hardware data plane subsystem, may be located on a fifth device 310, where the second 304, fourth 308, and fifth devices 310 are different devices and may be located at different geographical locations. Device 304 may be communicatively to devices 308 and 310 over one or more networks. A control plane subsystem may thus be located on a computing system or device that is remote from a computing system or device hosting or including a data plane subsystem.

Accordingly, in certain embodiments, the various subsystems or components of router 300 can be distributed across multiple devices that are remote from each other. It is however not required that the various subsystems of router 300 have to be distributed across multiple devices or computing systems. In certain embodiments, some of the subsystems of router 300 may be co-located on the same physical device while others may be distributed over multiple remote physical devices or computing systems. In some embodiments, the user of router 300 is provided the capability of configuring the locations of the individual subsystems of router 300, including the locations of the controllers, of the individual control plane subsystems, and of the individual data plane subsystems.

The ability for the different layers of a distributed router to be located on different physical devices enables the relationships between the controller and the control plane subsystems, and between the control plane subsystems and the data plane subsystems to be dynamic. For instance, with respect to the controller and the control plane subsystems, the control plane subsystems can be dynamically added or removed remotely from the controller, and the controller is able to operate with the dynamic changes. The locations of the control plane subsystems controlled by a controller may be dispersed both logically and physically in different physical devices. With respect to the control plane subsystems and the data plane subsystems, the data plane subsystems may be dynamically added or removed. For example, software data planes providing enhanced functionality and services may be dynamically added to the distributed router. The locations of the data plane subsystems controlled by a control plane subsystem may be dispersed both logically and physically in different physical devices.

Figure 4:
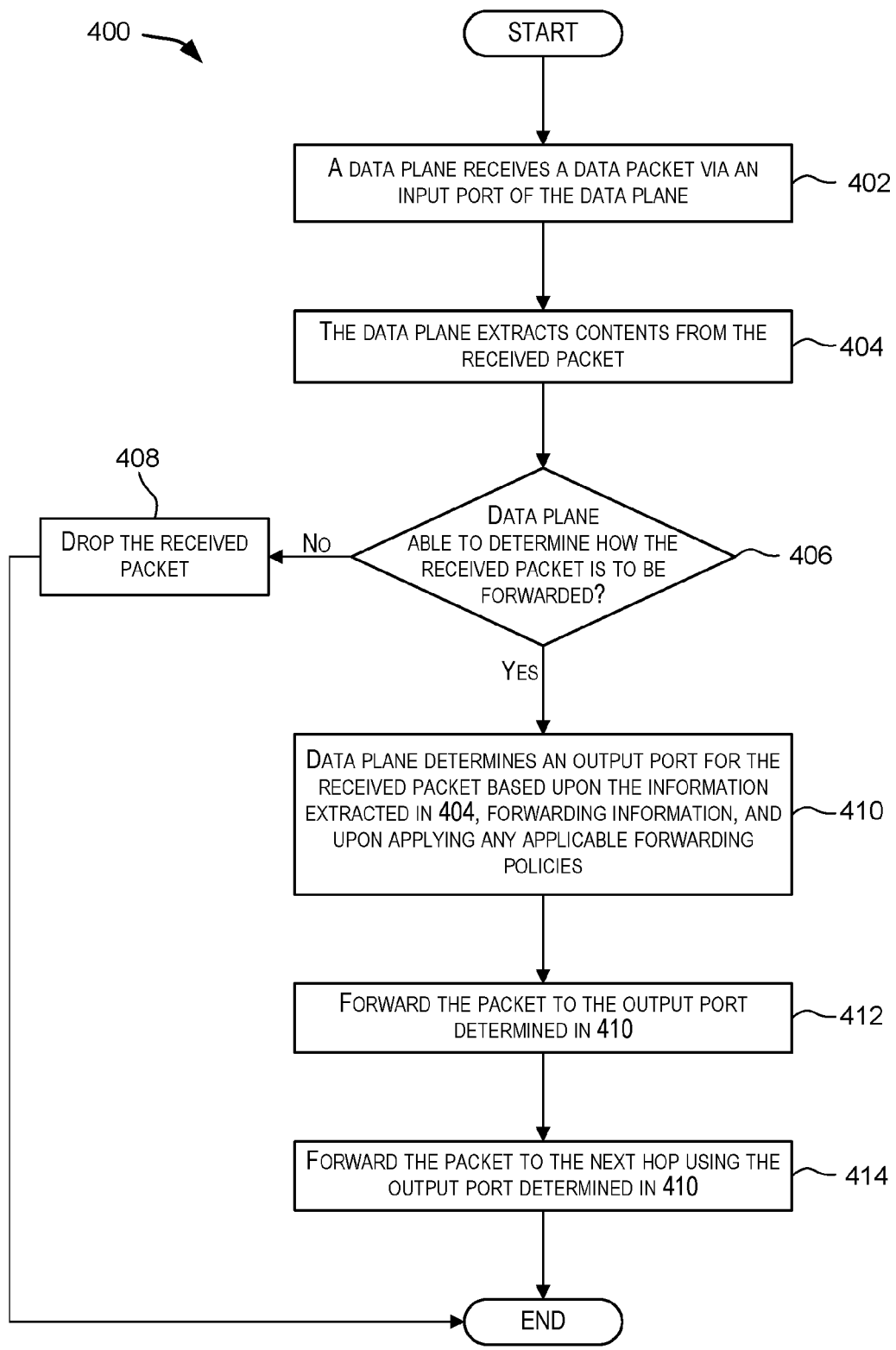
FIG. 4 depicts a simplified flowchart showing processing performed by a distributed router upon receiving a data packet according to an embodiment of the present invention.

FIG. 4 depicts a simplified flowchart 400 showing processing performed by a distributed router upon receiving a data packet according to an embodiment of the present invention. The processing depicted in FIG. 4 may be implemented in software (e.g., code, instructions, program) executed by one or more processing units (e.g., processors, cores), hardware, or combinations thereof. The software may be stored in memory (e.g., on a non-transitory computer-readable storage medium such as on a memory device). The particular series of processing steps depicted in FIG. 4 is not intended to be limiting. It is appreciated that the processing steps may be performed in an order different from that depicted in FIG. 4, and that not all the steps depicted in FIG. 4 need be performed. In one embodiment, the processing depicted in FIG. 4 may be performed by a data plane subsystem.

At 402, a data packet is received by a data plane subsystem via an input port of the data plane subsystem. The data plane subsystem may be a software data plane subsystem or a hardware data plane subsystem. The input port may be a logical port (or soft port) or a physical port.

At 404, the data plane subsystem extracts contents from the received packet. For example, the data plane subsystem may extract the header of the received data packet. The extracted information may include the source and destination IP addresses for the data packet.

At 406, the data plane subsystem determines whether it can forward the data packet. In one embodiment, the determination in 406 may be made based upon the contents of the packet extracted in 404, forwarding information available to the data plane subsystem, and upon applying any applicable forwarding policies (for example, as applied to a Forwarding Information Base as defined by the current state of the configured routing protocols and device policy). The forwarding information may be received by the data plane subsystem prior to receiving the data packet and stored by the data plane subsystem. In certain embodiments, the forwarding information may be derived from routing protocol information and network state. Information related to services provided by the data plane subsystem may also be used in 406 to determine whether the data plane subsystem is capable of processing and forwarding the received data packet.

If the data plane subsystem determines in 406 that it cannot forward the received data packet, then the data packet is dropped at 408. There could be various reasons why the data plane subsystem is not able to forward the data packet, such as, the routing protocols not having a valid path to the next hop, paths being unavailable, due to a network policy such as a firewall rule, and the like.

If the data plane subsystem determines in 406 that it can process the received data packet, then processing continues with 410. At 410, the data plane subsystem determines an output port to be used to forward the data packet from the data plane subsystem. The output port may be a logical port or a physical port. The software port may be running on a general purpose CPU co-resident with the data plane subsystem or it may be on a physically separated general purpose compute platform.

In one embodiment, the determination in 410 is based upon the packet information extracted in 404 and based upon forwarding information available to the data plane subsystem. As part of the processing in 410, data plane subsystem may determine the destination IP address of the data packet from the packet contents extracted in 404 and perform longest prefix matching on the destination address and then determine the optimal path for forwarding the data packet based upon the forwarding information available to the data plane subsystem. The output port may then be determined based upon the optimal path.

As part of the processing in 410, the data plane subsystem may also apply various policies and services that may be applicable for the data packet. For example, if a firewall policy has been specified and is applicable to the packet, then processing related to the firewall service may be performed. Policies may also be defined for other services provided by the data plane subsystem such as Network Address Translation (NAT), Policy Based Routing, Quality of Service (QoS), Q-in-Q, network security policy, Deep Packet Inspection (DPI), Longest Packet Match (LPM), and the like.

At 412, the data packet is forwarded to the output port determined in 410. The output port may be on the same data plane subsystem that received the data packet or may be on a different data plane subsystem. If on a different data plane subsystem, then the data packet is forwarded from the data plane subsystem receiving the data packet to the data plane subsystem containing the output port.

At 414, the data packet is forwarded to the next hop using the output port determined in 410. In the case that the packet is destined for a remote system, the data plane subsystem forwarding the packet may encapsulate the packet in a transport protocol (e.g., VXLAN) for transit through a physical network.

In certain instances, a data plane subsystem receiving a data packet may not be able to perform the complete set of services requested for that packet. In this scenario, the data plane subsystem, hardware or software, may be configured by control plane subsystems to create service chains, where a chain of data plane subsystems is created for performing multiple services. For example, in one embodiment, a service chain may be created where a first data plane subsystem is configured to perform a first service and a second data plane subsystem is configured to perform a second service for a data packet. Accordingly, in one scenario, when the first data plane subsystem receives a data packet, it performs the first service and then forwards the packet to the second data plane subsystem. The second data plane subsystem then performs the second service for the packet, determines an output port for the data packet, and then forwards the packet to the next hop via the determined output port. A service chain may include multiple data plane subsystems.

In a second scenario, when the first data plane subsystem receives a data packet, it performs the first service and then forwards the packet or a portion of the packet needed for the second service to the second data plane subsystem. The second data plane subsystem then performs the second service for the packet and returns the packet to the first data plane (or sends a signal to the first data plane subsystem that the second service has been performed). The first data plane subsystem then determines an output port for the data packet, and forwards the packet to the next hop via the determined output port.

For example, a user may have a Top-Of-Rack (TOR) switch and may want to run a stateful firewall in combination with the TOR switch. The TOR switch may comprise a first data plane subsystem and the stateful firewall may be implemented by a second data plane subsystem remote from the TOR switch. The second data plane subsystem may be executed by a virtual machine in the cloud, for example. The control plane subsystem would program, through a flow entry service chain, the data plane subsystem in the TOR to send a portion of the traffic that required stateful firewall to the second data plane subsystem running off the TOR for processing. The traffic may then be forwarded to the next hop by the second data plane subsystem.

As another example, a hardware data plane subsystem implemented using a multi-core NPU may be capable of performing multiprotocol label switching (MPLS). Accordingly, if a received data packet has to be forward using MPLS, the hardware data plane subsystem is capable of handling the packet forwarding and the forwarding can occur at the hardware layer without needing any help from any other data plane subsystems. However, if the received data packet is also to be processed for stateful firewall or for deep packet introspection (DPI) services, the hardware dataplane may send the packet to a software data plane subsystem that is configured to provide these services. Once the packet has been processed by the software data plane subsystems for these additional services, the data packet may be returned to the hardware data plane subsystem by the software data plane subsystem and the hardware data plane subsystem may then forward the packet to the next hop using MPLS. A similar framework may also be used for providing QoS services, where a hardware data plane subsystem forwards a received data packet to a software data plane subsystem for performing QoS-related processing, and then the data packet is forwarded by the hardware data plane subsystem.

Service chaining enables multiple services to be performed on a data packet possibly by different distributed data plane subsystems, either hardware data plane subsystems or software data plane subsystems. The distributed nature of router 100 enables service chaining to be enabled and performed in a flexible manner. The distributed router architecture allows versatility, such that a hardware data plane can leverage the capabilities of one or more software data plane subsystems or other hardware data plane subsystems. Likewise, a software data plane subsystem can leverage the capabilities of one or more other software data plane subsystems or other hardware data plane subsystems.

In certain embodiments, a data packet arriving at a port associated with the hardware data plane subsystem may be pre-processed to determine if the packet or certain aspects of the packet should be processed using the hardware data plane subsystem or if the packet should be transmitted to a software data plane subsystem for further processing. If so, the data packet may be forwarded to the software data plane subsystem, else the packet may be processed entirely by the hardware data plane subsystem.

Figure 5:
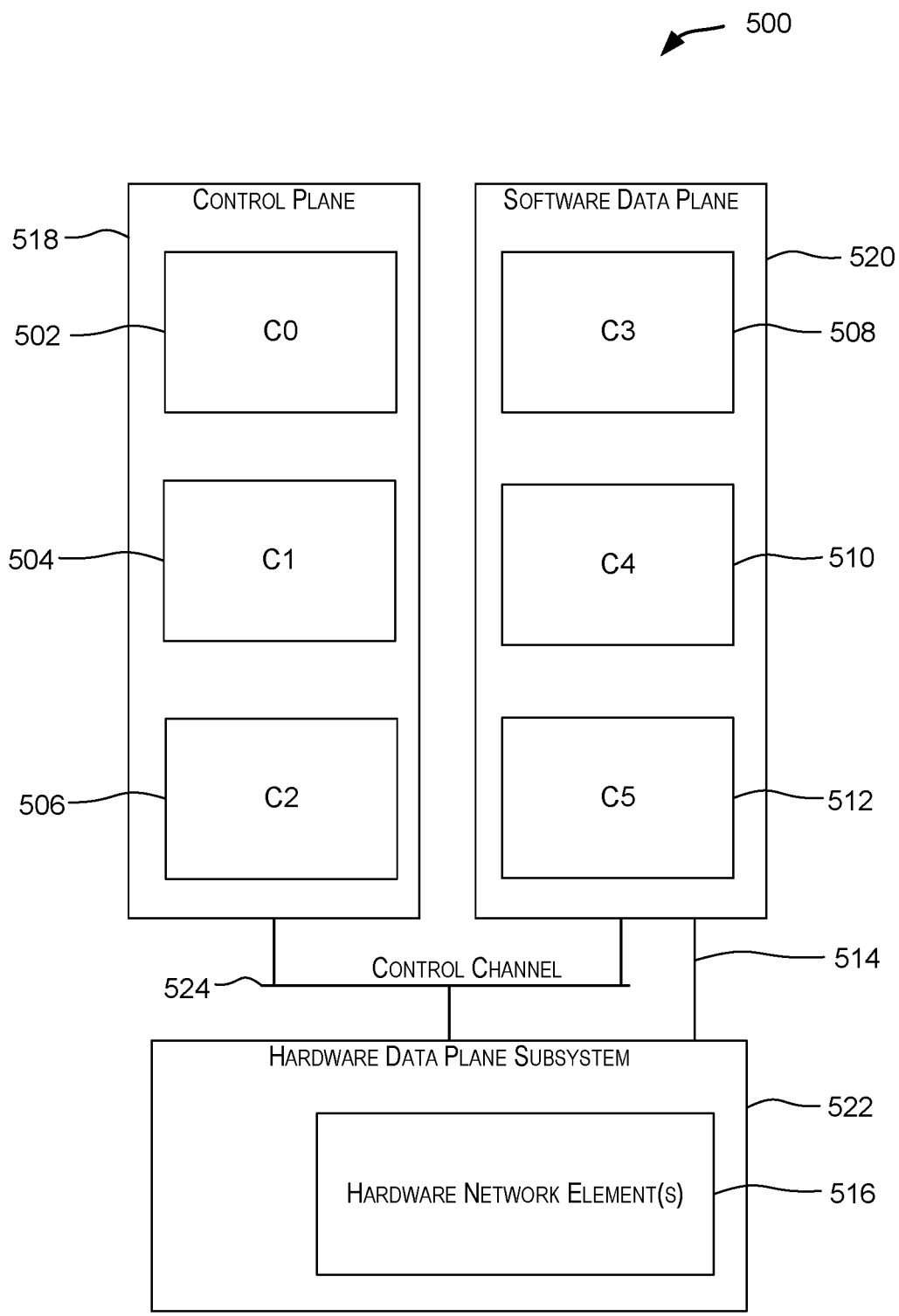
FIG. 5 illustrates an example of a distributed router according to an embodiment of the present invention.

FIG. 5 illustrates an example implementation and usage of processing resources for different components of a distributed router according to an embodiment of the present invention. Router 500 comprises instances of control plane subsystem 518, a software data plane subsystem 520, and a hardware data plane subsystem 522. The various subsystems depicted in FIG. 5 may be remotely located from one another and coupled to one another via one or more networks. The embodiment depicted in FIG. 5 is only an example; several other configurations may be implemented without deviating from the scope of the disclosure. For example, the number of cores assigned to a control plane subsystem or a data plane subsystem plane may be static or variable.

Control plane subsystem 518 is allocated and executed by processor cores C0 502, C1 504, and C2 506. Control plane subsystem 518 communicates with software data plane subsystem 520 and hardware data plane subsystem 522 via a control channel. Software data plane subsystem 520 is allocated and executed by cores C3 508, C4 510 and C5 512. The cores allocated to a subsystem may be from one or more processors.

Software data plane subsystem 520 may be coupled to hardware data plane subsystem 522 using an interconnect 514, such as a PCIe interconnect. In some instances, hardware data plane subsystem 522 may comprise one or more hardware network elements(s) 516 that are used for receiving and forwarding data packets.

In one embodiment, control plane subsystem 518 and/or software data plane subsystem 520 may be executed within virtual machines executed by router 500. The processing, memory, and networking resources allocated to these virtual machines may be dynamically changed depending upon need. Additional control plane subsystems or software data plane subsystems can be added to router 500, for example, by executing additional virtual machines for the subsystems to be added. The newly added subsystems can then communicate with the existing subsystems. In this manner, control plane subsystems and software data plane subsystems may be dynamically added to router 500.

Additional hardware data plane subsystems may also be added to router 500. The newly added hardware data plane subsystems can then dynamically communicate with the control plane subsystems using the control channel and with the software data plane subsystems using the PCIe interconnect 514. In this manner, the various subsystems of router 500 can be dynamically added (or removed).

Figure 6:
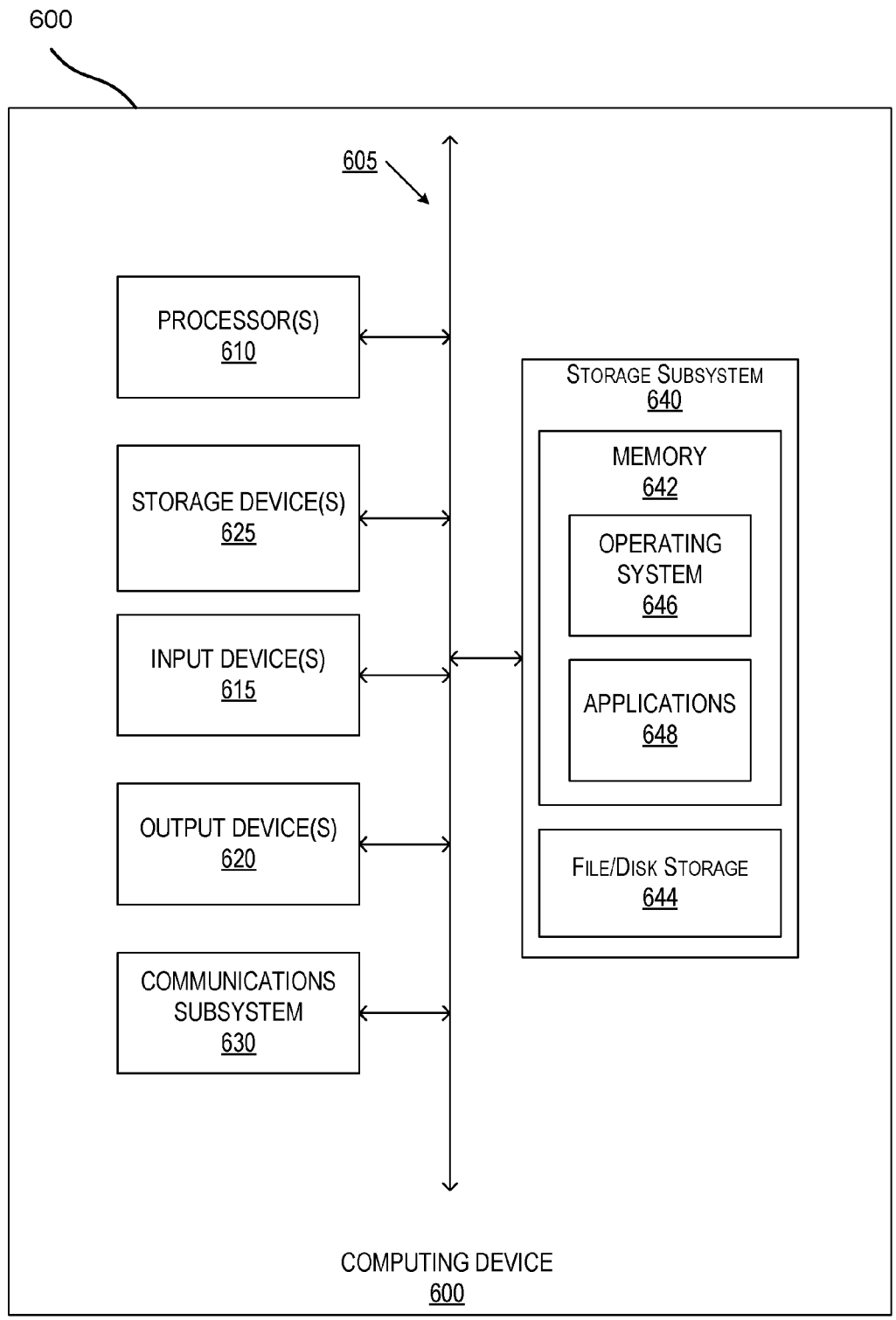
FIG. 6 is a simplified block diagram of a computing system or device that may be used to execute various components of a distributed router according to one or more aspects.

FIG. 6 is a simplified block diagram of a computing system or device 600 that may be used to execute various components or subsystems of a distributed router according to an embodiment of the present invention. In some embodiments, computing system 600 is configured to implement any of the methods described above. For example, one or more computer systems like computer system 600 may be used to execute one or more subsystems of a distributed router such as controller 102, one or more control plane subsystems 104, and one or more software data plane subsystems 108.

Computer system 600 can be of various types including, without limitation, a personal computer, a portable computer, a workstation, a network computer, a mainframe, a kiosk, a PDA, a cell phone, or any other data processing system. Due to the ever-changing nature of computers and networks, the description of computer system 600 depicted in FIG. 6 is intended only as a specific example for purposes of illustrating the preferred embodiment of the computer system. Many other configurations having more or fewer components than the system depicted in FIG. 6 are possible.

Computer system 600 is shown comprising hardware elements that can be electrically coupled via a bus 605. The hardware elements may include one or more processors 610, one or more input devices 615, one or more output devices 620, a communications subsystem 630, and a storage subsystem 640. Bus subsystem 605 provides a mechanism for letting the various components and subsystems of computer system 600 communicate with each other as intended. Although bus subsystem 605 is shown schematically as a single bus, alternative embodiments of the bus subsystem may utilize multiple busses.

Processors 610 represent the processing resources of computer system 600 and may include without limitation one or more general-purpose processors and/or one or more special-purpose processors (such as digital signal processing chips, graphics acceleration processors, and/or the like). Processors 610 may include one or more multicore processors.

Input devices 615 may include one or more different mechanisms for providing inputs to computer system 600 such as, without limitation, a mouse, a keyboard, a touchpad, a tablet, and/or the like. Output devices 620 may include one or more different mechanisms for outputting information from computer system 600 such as, without limitation, a display unit, a printer, and/or the like.

Computer system 600 may also include a communications subsystem 630, which facilitates communications to and from computer system 600. Communications subsystem 630 can include without limitation a modem, a network card (wireless or wired), an infrared communication device, a wireless communication device and/or chipset (such as a Bluetooth® device, an 802.11 device, a WiFi device, a WiMax device, cellular communication facilities, etc.), and/or the like. Communications subsystem 630 may permit data to be exchanged with a network, other computer systems, and/or any other devices described herein. In certain embodiments, communications subsystem 630 may include forwarding hardware that is used to implement a hardware data plane according to the teachings above.

Storage subsystem 640 provides a non-transitory medium for storing information and code (instructions) that can be executed by one or more processors 610. For example, storage subsystem 640 may be configured to store the basic programming and data constructs that provide the functionality of embodiments of the present invention. According to an embodiment of the present invention, software code instructions or modules implementing the functionality of the present invention may be stored in storage subsystem 640. These software modules may be executed by processor(s) 610. Storage subsystem 640 may also provide a repository for storing data used in accordance with the present invention. Storage subsystem 640 may comprise a memory subsystem 642 and a file/disk storage subsystem 644.

Memory subsystem 642 may include a number of memories such as a main random access memory (RAM) for storage of instructions and data during program execution, a read only memory (ROM) in which fixed instructions are stored, flash memory, and the like. Various software elements may be located within system memory 642 such as an operating system 646, device drivers, executable libraries, and/or other code, such as one or more application programs 648, which may comprise computer programs provided by various embodiments, and/or may be designed to implement methods, and/or configure systems, provided by other embodiments, as described herein.

File storage subsystem 644 provides persistent (non-volatile) storage for program and data files, and may include a hard disk drive, a floppy disk drive along with associated removable media, a Compact Disk Read Only Memory (CD-ROM) drive, an optical drive, removable media cartridges, local and/or network accessible storage, and other like storage media.

The terms "machine-readable medium" and "computer-readable medium," as used herein, refer to any non-transitory medium that participates in providing data that causes a machine to operate in a specific fashion. In an embodiment implemented using the computer system 600, various computer-readable media might be involved in providing instructions/code to processor(s) 610 for execution and/or might be used to store such instructions/code. Computer-readable medium may take many forms such as non-volatile media and volatile media.

The methods, systems, and devices discussed above are examples. Various embodiments may omit, substitute, or add various procedures or components as appropriate. For instance, in alternative configurations, the methods described may be performed in an order different from that described, and/or various stages may be added, omitted, and/or combined. Features described with respect to certain embodiments may be combined in various other embodiments. Different aspects and elements of the embodiments may be combined in a similar manner. Technology evolves and, thus, many of the elements are examples that do not limit the scope of the disclosure to those specific examples.

Specific details are given in the description to provide a thorough understanding of the embodiments. However, embodiments may be practiced without these specific details. For example, well-known circuits, processes, algorithms, structures, and techniques have been shown without unnecessary detail in order to avoid obscuring the embodiments. This description provides example embodiments only, and is not intended to limit the scope, applicability, or configuration of the invention. Rather, the preceding description of the embodiments will provide those skilled in the art with an enabling description for implementing embodiments of the invention. Various changes may be made in the function and arrangement of elements without departing from the spirit and scope of the invention.

Although specific embodiments of the invention have been described, various modifications, alterations, alternative constructions, and equivalents are also encompassed within the scope of the invention. Embodiments of the present invention are not restricted to operation within certain specific data processing environments, but are free to operate within a plurality of data processing environments. Additionally, although certain embodiments have been described using a particular series of transactions and steps, it should be apparent to those skilled in the art that the scope of the present invention is not limited to the described series of transactions and steps. Although some flowcharts describe operations as a sequential process, many of the operations can be performed in parallel or concurrently. In addition, the order of the operations may be rearranged. A process may have additional steps not included in the figure.

Further, while certain embodiments have been described using a particular combination of hardware and software, it should be recognized that other combinations of hardware and software are also within the scope of the present invention. Certain embodiments of the present invention may be implemented only in hardware, or only in software (e.g., code programs, firmware, middleware, microcode, etc.), or using combinations thereof. The various processes described herein can be implemented on the same processor or different processors in any combination. Accordingly, where components or modules are described as being configured to perform certain operations, such configuration can be accomplished, e.g., by designing electronic circuits to perform the operation, by programming programmable electronic circuits (such as microprocessors) to perform the operation such as by executing computer instructions or code, or any combination thereof. Processes can communicate using a variety of techniques including but not limited to conventional techniques for interprocess communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific invention embodiments have been described, these are not intended to be limiting. Various modifications and equivalents are within the scope of the following claims.

What is claimed is:

1. A router system comprising:
   a control plane subsystem located on a first device; and
   a plurality of data plane subsystems configured to forward data packets, the plurality of data plane subsystems including a first data plane subsystem and a second data plane subsystem, the first data plane subsystem located on a second device and the second data plane subsystem located on a third device;
   wherein the control plane subsystem is configured to:
      receive an instruction;
      determine an action based upon the instruction;
      communicate a message corresponding to the action to the first data plane subsystem; and
      communicate the message corresponding to the action to the second data plane subsystem;
   wherein the first data plane subsystem is a software data plane subsystem executed by the second device and is configured to perform processing corresponding to the action;
   wherein the second data plane subsystem is a hardware data plane subsystem comprising forwarding hardware and located on the third device and is configured to perform processing corresponding to the action; and
   wherein the control plane subsystem communicates the message to the first data plane subsystem and the second data plane subsystem using a control channel.

2. The router system of claim 1 wherein the forwarding hardware is a merchant silicon chip, a network interface card (NIC), or a field programmable gate array (FPGA).

3. The router system of claim 1 wherein:
the message is translated to a set of one or more application programming interfaces (APIs) corresponding to the forwarding hardware using a hardware abstraction layer (HAL); and
the forwarding hardware is configured to execute the set of APIs.

4. The router system of claim 1 further comprising:
a controller executed by a fourth device, the controller configured to communicate with a plurality of control plane subsystems, the plurality of control plane subsystems including the control plane subsystem;
wherein the control plane subsystem is configured to receive the instruction from the controller.

5. The router system of claim 1 wherein the first data plane subsystem is configured to:
receive a data packet via an input port;
determine an output port for forwarding the data packet; and
forward the data packet to a next hop using the determined output port.

6. The router system of claim 1 wherein the second data plane subsystem is configured to:
receive a data packet via an input port;
forward the data packet to the first data plane subsystem for performing a first service for the packet;
receive the data packet from the first data plane subsystem after the first data plane subsystem has performed the first service;
determine an output port for forwarding the data packet; and
forward the data packet using the determined output port.

7. The router system of claim 6 wherein:
the first service is one of a firewall service, quality of service (QoS), network address translation (NAT), or a security service for the data packet.

8. The router system of claim 1 wherein:
the first data plane subsystem is configured to:
receive a data packet via an input port;
perform processing corresponding to a first service for the data packet; and
forward the data packet to the second data plane subsystem; and
the second data plane subsystem is configured to:
receive the data packet from the first data plane subsystem;
perform processing corresponding to a second service for the data packet;
determine an output port for forwarding the data packet; and
forward the data packet to a next hop using the determined output port.

9. A method comprising:
receiving, by a control plane subsystem located on a first device, an instruction related to a network policy;
determining, by the control plane subsystem, an action based upon the instruction;
communicating, by the control plane subsystem, a message corresponding to the action to a first data plane subsystem that is a software data plane subsystem executed by a second device different from the first device, the first data plane subsystem configured to forward data packets, using a control channel to communicate the message to the first data plane sub system;
communicating, by the control plane subsystem, the message corresponding to the action to a second data plane subsystem that is a hardware data plane subsystem comprising forwarding hardware located on a third device different from the first device, the second data plane subsystem configured to forward data packets, using the control channel to communicate the message to the second data plane subsystem;
performing processing, by the first data plane subsystem, responsive to receiving the message from the control plane subsystem; and
performing processing, by the second data plane subsystem, responsive to receiving the message from the control plane subsystem.

10. The method of claim 9
further comprising:
translating the message to a set of one or more application programming interfaces (APIs) corresponding to the forwarding hardware; and
executing the set of APIs by the forwarding hardware.

11. The method of claim 9 further comprising:
executing, by a fourth device, a controller configured to communicate with a plurality of control plane subsystems, the plurality of control plane subsystems including the control plane subsystem; and
communicating the instruction from the controller to the control plane subsystem.

12. The method of claim 9 further comprising:
receiving, by the first data plane subsystem, a data packet via an input port;
determining, by the first data plane subsystem, an output port for forwarding the data packet; and
forwarding, by the first data plane subsystem, the data packet to a next hop using the determined output port.

13. The method of claim 9 further comprising:
receiving, by the first data plane subsystem, a data packet via an input port;
forwarding, by the first data plane subsystem, the data packet to the second data plane subsystem for performing a first service for the packet;
performing, by the second data plane subsystem, the first service;
receiving, by the first data plane subsystem, the data packet from the second data plane subsystem after the second data plane subsystem has performed the first service;
determining, by the first data plane subsystem, an output port for forwarding the data packet; and
forwarding, by the first data plane subsystem, the data packet using the determined output port.

14. The method of claim 9 further comprising:
receiving, by the first data plane subsystem, a data packet via an input port;
performing processing, by the first data plane subsystem, corresponding to a first service for the data packet;
forwarding, by the first data plane subsystem, the data packet to the second data plane subsystem;
performing processing, by the second data plane subsystem, corresponding to a second service for the data packet;
determining, by the second data plane subsystem, an output port for forwarding the data packet; and
forwarding, by the second data plane subsystem, the data packet to a next hop using the determined output port.

15. A system comprising:
a controller executed by a first device;
a plurality of control plane subsystems controlled by the controller, the plurality of control plane subsystems including a first control plane subsystem executed by a second device; and a plurality of data plane subsystems controlled by the first control plane subsystem, each data plane subsystem in the plurality of data plane subsystems configured to forward data packets, the plurality of data plane subsystems including a software data plane subsystem executed by a third device and a hardware data plane subsystem located on a fourth device, the software data plane subsystem configured to forward data packets received by the software data plane subsystem using first forwarding information, and the hardware data plane subsystem configured to forward data packets received by the hardware data plane subsystem using second forwarding information; and wherein:

the first control plane subsystem is configured to:

receive an instruction related to a network policy from the controller;

determine an action to be performed for implementing the instruction; and communicate the action to the software data plane subsystem; and the software data plane subsystem is configured to perform the action resulting in the first forwarding information being updated.

16. The system of claim 15 wherein:

the first control plane subsystem is configured to communicate the action to the hardware data plane subsystem; and the hardware data plane subsystem is configured to perform processing causing the second forwarding information to be updated.

17. The system of claim 15 wherein:

the software data plane subsystem is configured to:

receive a first data packet;

perform processing related to a first service for the first data packet;

determine a first output port for the first data packet based upon the first forwarding information; and forward the first data packet using the first output port; and the hardware data plane subsystem is configured to:

receive a second data packet;

perform processing related to a second service for the first data packet, the second service being different from the first service;

determine a second output port for the first data packet based upon the second forwarding information; and forward the second data packet using the second output port.

* * * * *